United States Patent
Sheik-Bahae et al.

(10) Patent No.: US 12,500,386 B1
(45) Date of Patent: Dec. 16, 2025

(54) METHODS FOR SPECTRALLY-SELECTIVE LASER CIRCULATION FOR CRYOGENIC OPTICAL REFRIGERATION

(71) Applicant: UNM RAINFOREST INNOVATIONS, Albuquerque, NM (US)

(72) Inventors: Mansoor Sheik-Bahae, Albuquerque, NM (US); Alexander Robert Albrecht, Albuquerque, NM (US); Azzurra Volpi, Albuquerque, NM (US); Jackson Kock, Albuquerque, NM (US)

( * ) Notice: Subject to any disclaimer, the term of this patent is extended or adjusted under 35 U.S.C. 154(b) by 854 days.

(21) Appl. No.: 17/842,249

(22) Filed: Jun. 16, 2022

Related U.S. Application Data (60) Provisional application No. 63/211,971, filed on Jun. 17, 2021.

(51) Int. Cl.
*H01S 3/16* (2006.01)
*H01S 3/04* (2006.01)

(52) U.S. Cl.
CPC .......... *H01S 3/0408* (2013.01); *H01S 3/1618* (2013.01)

(58) Field of Classification Search
CPC .............................. H01S 3/0408; H01S 3/1618
See application file for complete search history.

(56) References Cited

U.S. PATENT DOCUMENTS

| | | | | |
|---|---|---|---|---|
| 6,041,610 A | * | 3/2000 | Edwards | F25B 23/003 62/3.1 |
| 6,378,321 B1 | * | 4/2002 | Epstein | F25B 23/00 62/3.1 |
| 8,720,219 B1 | * | 5/2014 | Sheik-Bahae | F25B 23/00 62/3.1 |
| 9,209,598 B1 | * | 12/2015 | Reagan | H01S 3/042 |
| 9,574,801 B1 | * | 2/2017 | Seletskiy | F25B 23/00 |
| 2013/0301117 A1 | * | 11/2013 | Zapata | H01S 3/06 359/342 |
| 2015/0075181 A1 | * | 3/2015 | Epstein | F25B 23/003 62/3.1 |

OTHER PUBLICATIONS

Gragossian, Aram et al. "Astigmatic Herriott cell for optical refrigeration." Optical Engineering 56.1 (2017): 011110-011110.
Hehlen, Markus P. et al. "First demonstration of an all-solid-state optical cryocooler." Light: Science & Applications 7.1 (2018): 15.
Volpi, Azzurra et al. "Optical refrigeration: the role of parasitic absorption at cryogenic temperatures." Optics Express 27.21 (2019): 29710-29718.

\* cited by examiner

*Primary Examiner* — Kinam Park
(74) *Attorney, Agent, or Firm* — MH2 Technology Law Group LLP (57) ABSTRACT

A laser cooling system and a method of laser cooling are disclosed. The laser cooling system includes a multi-pass optical cavity; a first mirror positioned at a first end of the multi-pass optical cavity; and a second mirror positioned at a second end of the multi-pass optical cavity, wherein the first mirror or the second mirror comprises a spectrally selective coating to suppress amplified spontaneous emission (ASE) and parasitic lasing to avoid undesired heat generation in a material being cooled in the multi-pass optical cavity.

21 Claims, 12 Drawing Sheets

METHODS FOR SPECTRALLY-SELECTIVE LASER CIRCULATION FOR CRYOGENIC OPTICAL REFRIGERATION

CROSS REFERENCE TO RELATED APPLICATIONS

This application claims priority to U.S. provisional patent application No. 63/211,971 filed on Jun. 17, 2021, the disclosure of which is hereby incorporated by reference in its entirety.

GOVERNMENT SUPPORT

This disclosure was made with Government support under grant number FA 9550-16-1-0362 awarded by the Air Force Office of Scientific Research (AFOSR) and grant number 17-0964 awarded by Defense Advanced Research Projects Agency (DARPA). The Government has certain rights in the invention.

FIELD

Implementations of the disclosure relate generally to methods, devices, and systems for spectrally selective laser circulation for cryogenic optical refrigeration.

BACKGROUND

Optical refrigeration, also referred to as laser cooling of solids, relies on anti-Stokes fluorescence, typically from rare-earth ions to remove heat from a glass or crystalline host. UNM has been the leading institution in the world in this research. UNM scientists have cooled a ytterbium-doped yttrium lithium fluoride (Yb:YLF) crystal to temperatures as low as 87 K starting from room temperature. This has paved the way for the demonstration of the world's first all-solid-state cryocooler, cooling an HgCdTe sensor with a Yb:YLF crystal to 134 K. The most recent experiments showed improved cooling of a payload below 130 K.

Figure 1A:
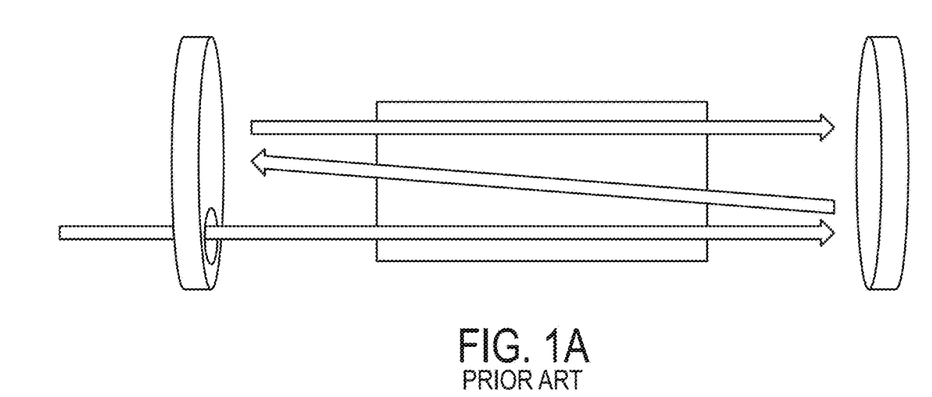
FIG. 1A shows a conventional astigmatic Herriott Cell demonstrating multi-pass pump laser coupling.
Figure 1B:
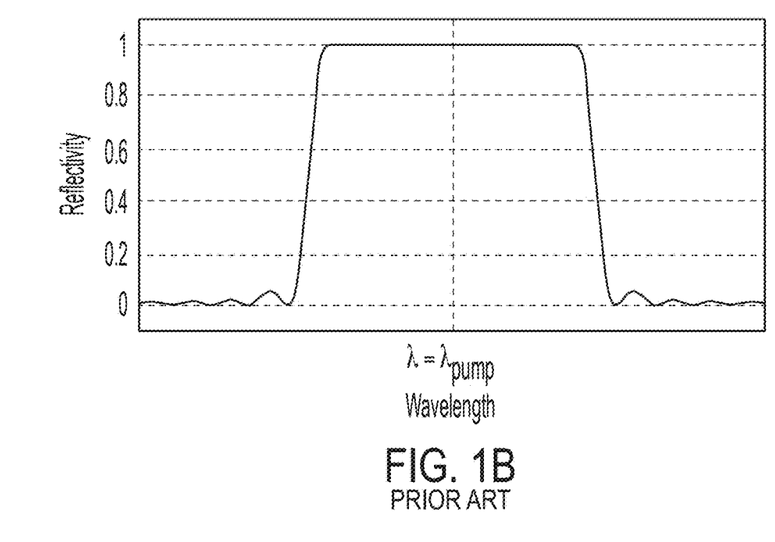
FIG. 1B shows a broadband reflectivity plot for the mirrors of FIG. 1A.

Due to the sharp drop of resonant absorption in the anti-Stokes regime, cryogenic optical refrigeration requires multi-pass pumping schemes to ensure sufficiently high pump absorption at cryogenic temperatures. A pump laser circulator or cavity, such as an astigmatic Herriott Cell (HC) is typically implemented to optimize the pump laser coupling. FIG. 1A shows a conventional astigmatic HC demonstrating multi-pass pump laser coupling. FIG. 1B shows a broadband reflectivity plot for the mirrors of FIG. 1A. The conventional astigmatic HC includes 2 (or more) mirror multi-pass cavity (FIG. 1A) that surrounds the cooling crystal and allows up to hundreds of pump passes through the cooling crystal. While this is beneficial to optimizing pump coupling, an adverse effect from the HC is that the photoluminescence (PL) from the crystal is also directed back into the crystal if mirrors with broadband reflectivity are used.

As the longer-wavelength PL traverses the crystal it can experience amplified spontaneous emission (ASE). In addition, as the temperature of the crystal decreases, the resonant absorption drops, and the number of passes of the pump through the crystal increases. With the increase of the fill factor, fractional area of the sample cross-section occupied by the pump beam, more pathways become available for ASE and parasitic lasing. Additionally, at cryogenic temperatures, the quasi-3-level nature of Yb gain media transitions to a 4-level laser structure, lowering the threshold for the onset of lasing. The energy difference from the pump to amplified emission and parasitic lasing is retained inside of the cooling crystal, acting as heating sources, that interfere with the cooling process. Therefore, ASE and parasitic lasing need to be effectively suppressed for efficient operation at cryogenic temperatures and scaling to high pump power.

Thus, a heretofore unaddressed need exists in the industry to address the aforementioned deficiencies and inadequacies.

SUMMARY

According to examples of the present disclosure, a laser cooling system is disclosed. The laser cooling system comprises a multi-pass optical cavity; a first mirror positioned at a first end of the multi-pass optical cavity; and a second mirror positioned at a second end of the multi-pass optical cavity, wherein the first mirror or the second mirror comprises a spectrally selective coating to suppress amplified spontaneous emission (ASE) and parasitic lasing prevent that eventually leads to undesired heat generation in a material being cooled in the multi-pass optical cavity. The laser cooling system can include one or more of the following features. The first mirror comprises a hole to allow a pump laser beam to enter the multi-pass optical cavity. The material being cooled comprises a rare-earth-doped crystal. The spectrally selective coating introduces a loss at wavelengths longer than a pump laser and prevents buildup of ASE and eliminates laser oscillation at longer wavelengths by ensuring a net optical gain that never exceeds losses in each roundtrip in the multi-pass optical cavity. The first mirror, the second mirror, or both the first mirror and the second mirror have low reflectivity for longer wavelengths of a fluorescence spectrum. The spectrally selective coating comprises a dielectric coating deposited onto or a distributed Bragg reflector bonded to a surface of the first mirror or the second mirror. Alternatively, instead of using external mirrors, the spectrally selective coating can be applied to one or more surfaces of the material being cooled, by depositing a dielectric coating onto a surface of the material being cooled, or by bonding a distributed Bragg reflector to a surface of the material being cooled. The spectrally selective coating provides high reflectivity at a pump laser wavelength. As an example, the high reflectivity is greater than 99% at about 1020 nm for a Yb-based cooling material. The spectrally selective coating provides a drop-off of reflectivity for wavelengths longer than a pump wavelength. The drop-off of reflectivity is about less than 97% at 1030 nm for and about less than 90% at 1040 nm for a Yb-based cooling material. The spectrally selective coating may provide lower reflectivity at shorter wavelengths than a pump wavelength to enhance the fluorescence escape efficiency. The last requirement is useful but not necessary.

According to examples of the present disclosure, a laser cooling system is disclosed. The laser cooling system comprises a multi-pass optical cavity; a first mirror positioned at a first end of the multi-pass optical cavity; a second mirror positioned at a second end of the multi-pass optical cavity; a wavelength-selective element positioned in the multi-pass optical cavity, wherein the wavelength-selective element comprises a spectrally selective coating to suppress amplified spontaneous emission (ASE) and parasitic lasing to avoid undesired heat generation in a material being cooled in the multi-pass optical cavity. The laser cooling system can include one or more of the following features. The wavelength-selective element deflects or absorbs wavelength longer than a pump laser wavelength. The wavelength-selective element comprises dichroic or narrow-band filter, a birefringent filter, a prism, or a diffractive element. The material being cooled comprises a rare-earth-doped crystal. The spectrally selective coating introduces a loss at wavelengths longer than a pump laser and prevents buildup of ASE and eliminates laser oscillation at longer wavelengths by ensuring a net optical gain that never exceeds losses in each roundtrip in the multi-pass optical cavity. The first mirror, the second mirror, or both the first mirror and the second mirror have low reflectivity for longer wavelengths of a fluorescence spectrum. The spectrally selective coating comprises a dielectric coating or a distributed Bragg reflector that is deposited on a surface of the first mirror or the second mirror. The material being cooled comprises an additional spectrally selective coating that comprises a dielectric coating or a distributed Bragg reflector that is deposited on a surface of the material being cooled. The spectrally selective coating provides high reflectivity at a pump laser wavelength. The high reflectivity is greater than 99% at about 1020 nm for a Yb-based cooling material. The spectrally selective coating provides a drop-off of reflectivity for wavelengths longer than a pump wavelength. The drop-off of reflectivity is about less than 97% at 1030 nm for and about less than 90% at 1040 nm for a Yb-based cooling material. The spectrally selective coating provides lower reflectivity at shorter wavelengths than a pump wavelength.

According to examples of the present disclosure, a method for laser cooling is disclosed The method comprises directing a pump laser beam into a multi-pass optical cavity, the multi-pass cavity comprising a first mirror positioned at a first end of the multi-pass optical cavity and a second mirror positioned at a second end of the multi-pass optical cavity, wherein the first mirror or the second mirror comprises a spectrally selective coating to suppress amplified spontaneous emission (ASE) and parasitic lasing to avoid undesired heat generation in a material being cooled in the multi-pass optical cavity; and optically cooling the material by repeated passes of the pump laser beam. The method for laser cooling can include one or more of the following features. The first mirror comprises a hole to allow an input laser beam to enter and an output laser beam to exit the multi-pass optical cavity. The material being cooled comprises a rare-earth-doped crystal. The spectrally selective coating introduces a loss at wavelengths longer than a pump laser and prevents buildup of ASE while eliminating laser oscillation at longer wavelengths by ensuring a net optical gain that never exceeds losses in each roundtrip in the multi-pass optical cavity. The first mirror, the second mirror, or both the first mirror and the second mirror have low reflectivity for longer wavelengths of a fluorescence spectrum.

According to examples of the present disclosure, a method of laser cooling is disclosed. The method of laser cooling comprises directing a pump laser beam to a multi-pass optical cavity, wherein the multi-pass optical cavity comprises a first mirror positioned at a first end of the multi-pass optical cavity, a second mirror positioned at a second end of the multi-pass optical cavity, and a wavelength-selective element positioned in the multi-pass optical cavity, wherein the wavelength-selective element comprises a spectrally selective coating to suppress amplified spontaneous emission (ASE) and parasitic lasing to avoid undesired heat generation in a material being cooled in the multi-pass optical cavity; and optically cooling the material by repeated passes of the pump laser beam. The method of laser cooling can include one or more of the following features. The wavelength-selective element deflects or absorbs wavelength longer than a pump laser wavelength. The wavelength-selective element comprises dichroic or narrow-band filter, a birefringent filter, a prism, or a diffractive element. The wavelength-selective element deflects or absorbs wavelength longer than a pump laser wavelength. The wavelength-selective element comprises dichroic or narrow-band filter, a birefringent filter, a prism, or a diffractive element. The material being cooled comprises a rare-earth-doped crystal. The spectrally selective coating introduces a loss at wavelengths longer than a pump laser and prevents buildup of ASE and eliminates laser oscillation at longer wavelengths by ensuring a net optical gain that never exceeds losses in each roundtrip in the multi-pass optical cavity. The first mirror, the second mirror, or both the first mirror and the second mirror have low reflectivity for longer wavelengths of a fluorescence spectrum. The spectrally selective coating comprises a dielectric coating or a distributed Bragg reflector that is deposited on a surface of the first mirror or the second mirror. The material being cooled comprises an additional spectrally selective coating that comprises a dielectric coating or a distributed Bragg reflector that is deposited on a surface of the material being cooled. The spectrally selective coating provides high reflectivity at a pump laser wavelength. The high reflectivity is greater than 99% at about 1020 nm for a Yb-based cooling material. The spectrally selective coating provides a drop-off of reflectivity for wavelengths longer than a pump wavelength. The drop-off of reflectivity is about less than 97% at 1030 nm for and about less than 90% at 1040 nm for a Yb-based cooling material. The spectrally selective coating provides lower reflectivity at shorter wavelengths than a pump wavelength.

BRIEF DESCRIPTION OF THE DRAWINGS

The accompanying drawings, which are incorporated in and constitute a part of this specification, illustrate embodiments of the present teachings and together with the description, serve to explain the principles of the disclosure.

DETAILED DESCRIPTION

Reference will now be made in detail to the present embodiments, examples of which are illustrated in the accompanying drawings. Wherever possible, the same reference numbers will be used throughout the drawings to refer to the same or like parts.

Generally speaking, a spectrally selective element to suppress amplified spontaneous emission (ASE) and parasitic lasing in optical refrigerators is disclosed. Suppressing ASE and parasitic lasing remove undesired heat generation from the crystal, that degrade the performances of optical refrigerators at cryogenic temperatures, enabling the scaling to high pump power. More specifically, an all-solid state optical cryocooler that is based on anti-Stokes fluorescence in a 10% doped Yb:YLF crystal is disclosed with a demonstrated payload temperature below 125K from room temperature. This performance was achieved by improving the thermal transport and fluorescence escapee using a textured-MgF$_2$ thermal link, as well as by suppression of the parasitic stimulation emission using spectrally-selective high-reflection coatings in the pump circulator cavity.

In recent experiments, it has been discovered that amplified spontaneous emission (ASE) and parasitic lasing interfere with cryogenic optical refrigeration, preventing the scaling to high pump power (~100-150 W). Accordingly, according to examples of the present disclosure, a spectrally selective optical element is used in a multipass pumping cavity of a rare-earth-doped optical refrigerator (e.g. Yb, Tm, Ho, Er, . . . ), to efficiently suppress feedback of the fluorescence at wavelengths longer that the pump wavelength leading to ASE and parasitic lasing in the cooling crystal at cryogenic temperatures. The use of a spectrally selective element introduces a significant loss at wavelengths longer than the pump, thus preventing buildup of ASE and eliminating laser oscillation at these long wavelengths by ensuring the net optical gain never exceeds the losses in each roundtrip.

Figure 2A:
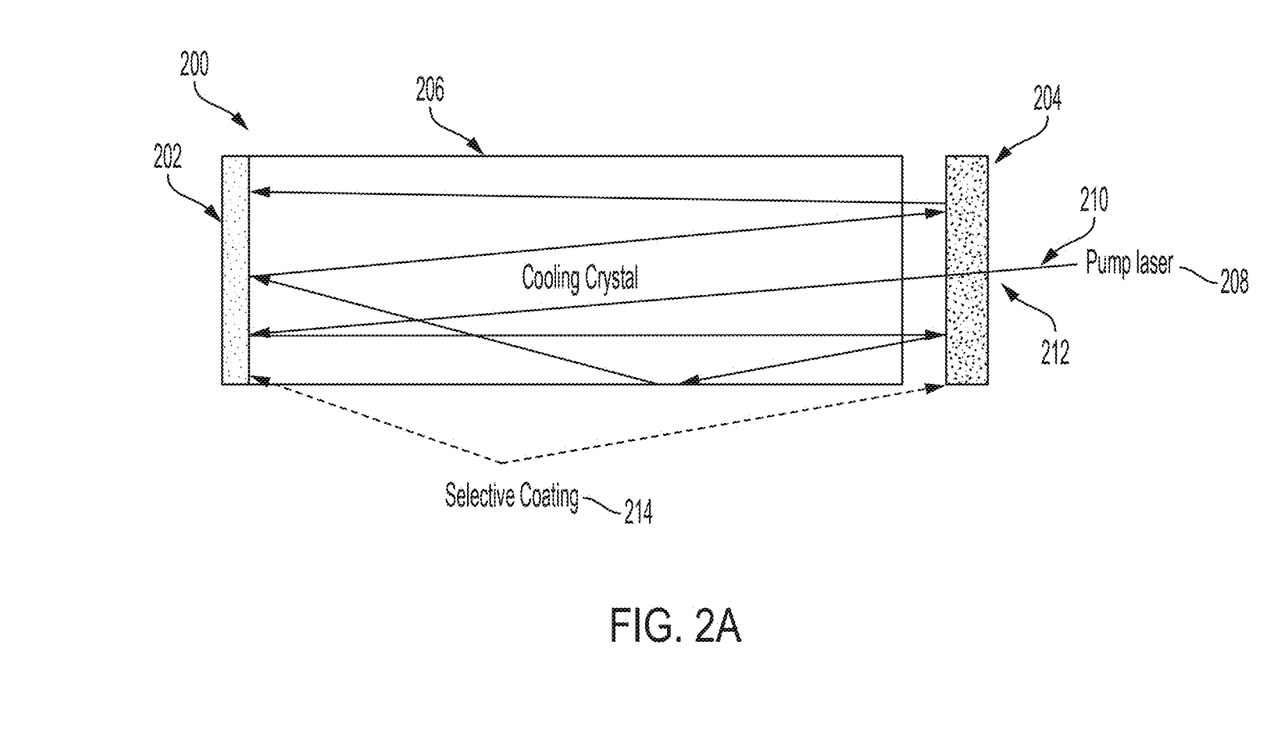
FIG. 2A shows a multi-pass pumping (Herriott cell) using two external mirrors according to examples of the present teachings.
Figure 2B:
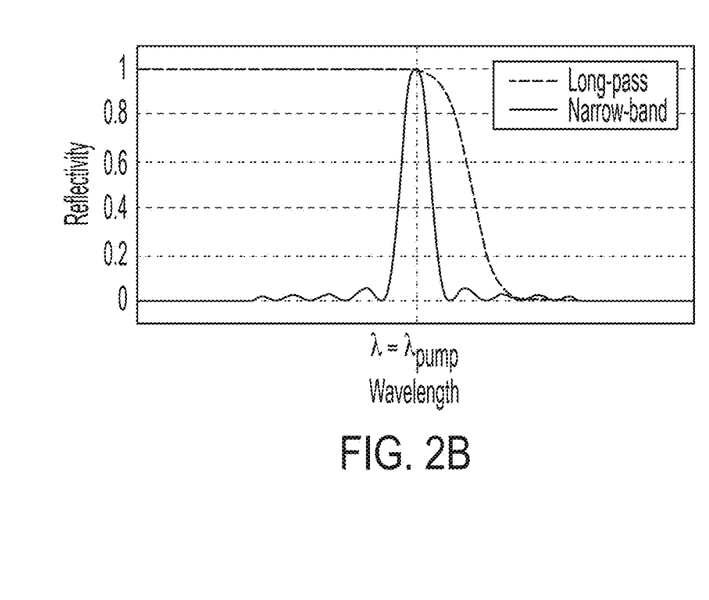
FIG. 2B shows a plot of reflectivity of spectrally selective coating for the arrangement of FIG. 2A for at least one of the cavity mirrors, for suppression of ASE and parasitic lasing according to examples of the present teachings.

FIG. 2A shows a multi-pass pumping arrangement (Herriott cell) 200 using two external mirrors according to examples of the present teachings. FIG. 2B shows a plot of reflectivity of spectrally selective coating for the arrangement of FIG. 2A for at least one of the cavity mirrors, for suppression of ASE and parasitic lasing according to examples of the present teachings. As shown in FIG. 2A, the multi-pass pumping arrangement 200 comprises a first mirror 202, a second mirror 204, and a cooling crystal 206. A pump laser 208 produces a pump beam 210 which passes through an aperture 212 in the second mirror 204. At least one of the first mirror 202 or the second mirror 204 comprises a spectrally selective coating 214 formed, deposited, or positioned on an inward facing surface with respect to the cooling crystal 206. In some examples, at least one of the first mirror 202 or the second mirror 204 can be external to the multi-pass pumping cell. In some examples, the spectrally selective coating 214 can be coated onto one or more of the crystal facets of the cooling crystal.

In some examples, the spectrally selective coating 214 comprises a dielectric coating or a distributed Bragg reflector that is deposited on a surface of the first mirror or the second mirror. The material being cooled comprises an additional spectrally selective coating that comprises a dielectric coating or a distributed Bragg reflector that is deposited on a surface of the material being cooled. The spectrally selective coating 214 can provide high reflectivity at a pump laser wavelength. The high reflectivity is greater than 99% at about 1020 nm for a Yb-based cooling material. The spectrally selective coating 214 can provide a drop-off of reflectivity for wavelengths longer than a pump wavelength. The drop-off of reflectivity is about less than 97% at 1030 nm for and about less than 90% at 1040 nm for a Yb-based cooling material. The spectrally selective coating 214 can provide lower reflectivity at shorter wavelengths than a pump wavelength of the pump beam 210. In some examples, the first mirror 202 and/or the second mirror 204 can be attached to the cooling crystal 208 that forms the multi-pass cell. The cooling crystal 208 is inside the multi-pass cell.

Based on estimations, that account for unsaturated gain of the cooling crystal (in this case: Yb:YLF) and filling factor of the astigmatic Herriot cell, the coating reflectivity should present the following spectral profile for effective suppression of ASE and parasitic lasing at cryogenic temperatures: R>99% @ 1020 nm, R≤97% @ 1030 nm, R≤90% @ 1040 nm, R≤80%-85% @ λ>1050 nm. In some examples, the multi-pass pumping mirrors 204 or 206 can comprise the spectrally selective coating 214 with low reflectivity for the longer wavelength of the fluorescence spectrum. The first mirror 202 or the second mirror 204 of the multi-pass pumping arrangement 200 can either have high reflectivity at wavelength shorter than the pump wavelength (1020 nm for Yb), and fall off at longer wavelength, or a narrow-band mirror with high reflectivity only at the pump wavelength can be utilized as well, as long as the reflectivity drops off fast enough for wavelength longer than the pump.

Figure 3A:
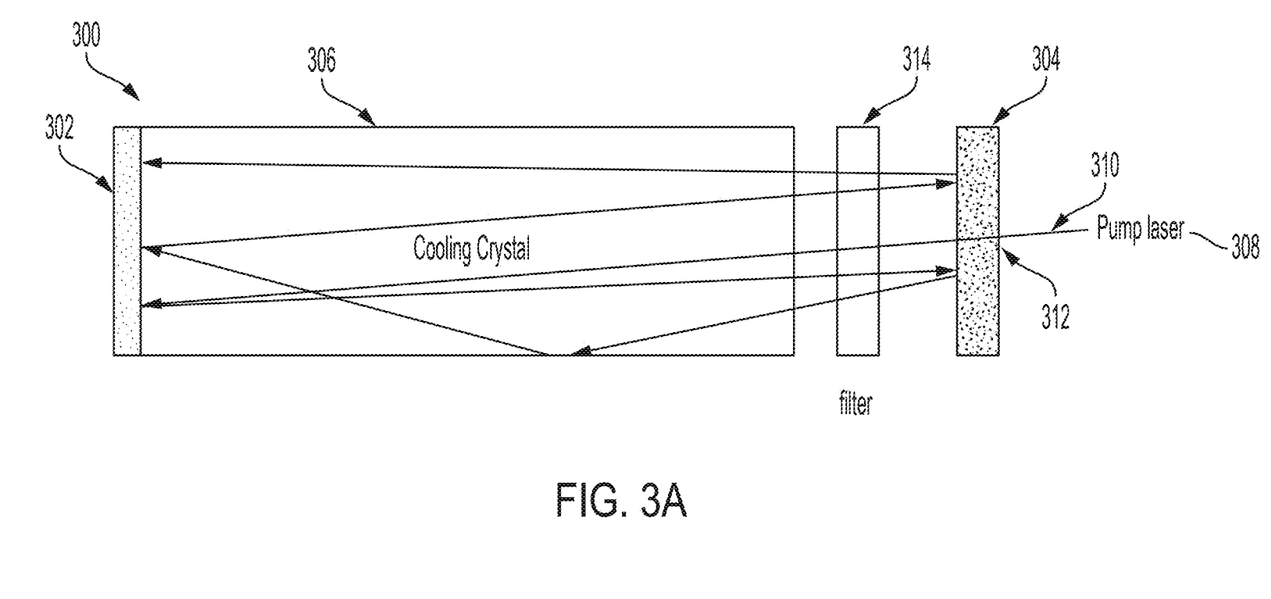
FIG. 3A shows an intracavity wavelength-selective element (filter) to suppress ASE and parasitic lasing according to examples of the present teachings.
Figure 3B:
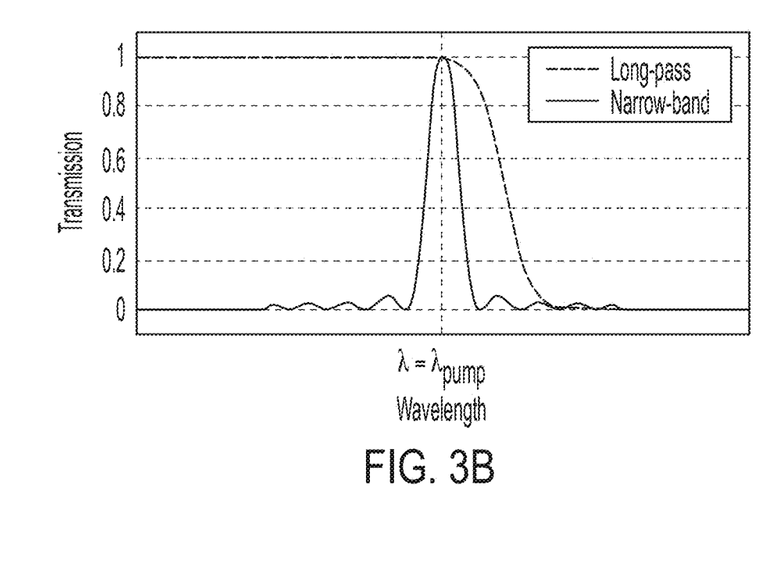
FIG. 3B shows a plot of reflectivity for the arrangement of FIG. 3A

FIG. 3A shows multi-pass pumping arrangement 300 with an intracavity wavelength-selective element (filter) 314 that suppresses ASE and parasitic lasing according to examples of the present disclosure. FIG. 3B shows a plot of transmission of the wavelength-selective element (filter) for the arrangement of FIG. 3A for suppression of ASE and parasitic lasing according to examples of the present teachings. As shown in FIG. 3A, the multi-pass pumping arrangement 300 comprises a first mirror 302, a second mirror 304, a cooling crystal 306, and the intracavity wavelength-selective element or filter 314. A pump laser 308 produces a pump beam 310 which passes through an aperture 312 in the second mirror 304. The cooling crystal 306 is optically pumped by the pump laser 308. In some examples, at least one of the first mirror 302 or the second mirror 304 can be external to the multi-pass pumping arrangement 300. As shown in FIG. 3A, second mirror 304 is the external mirror.

In some examples, a wavelength-selective element 314 can be inserted into the multi-pass cavity to deflect (or absorb) wavelengths longer than the pump wavelength of the pump beam 310. In some examples, the wavelength-selective element 314 can include a dichroic or narrow-band filter that will transmit the pump wavelength with minimal losses, but reflect any longer-wavelength PL out of the cavity and/or absorb it. In some examples, the wavelength-selective element 314 can include a birefringent filter that is positioned into the multi-pass cavity at a Brewster's angle relative to the polarization of the pump laser the produces the pump beam 310, with the rotation angle of the filter adjusted to allow for extremely low loss circulation of the pump beam inside the cavity. Other wavelengths as well as other polarizations of light, like in the unpolarized PL, would experience higher reflection losses on the birefringent filter, thereby suppressing ASE and lasing.

In some examples, the wavelength-selective element 314 can include a spectrally selective coating that can comprise a dielectric coating or a distributed Bragg reflector that is deposited on a surface of the first mirror or the second mirror. The material being cooled comprises an additional spectrally selective coating that comprises a dielectric coating or a distributed Bragg reflector that is deposited on a surface of the material being cooled. The spectrally selective coating can provide high reflectivity at a pump laser wavelength. The high reflectivity is greater than 99% at about 1020 nm for a Yb-based cooling material. The spectrally selective coating can provide a drop-off of reflectivity for wavelengths longer than a pump wavelength. The drop-off of reflectivity is about less than 97% at 1030 nm for and about less than 90% at 1040 nm for a Yb-based cooling material. The spectrally selective coating can provide lower reflectivity at shorter wavelengths than a pump wavelength.

Figure 4:
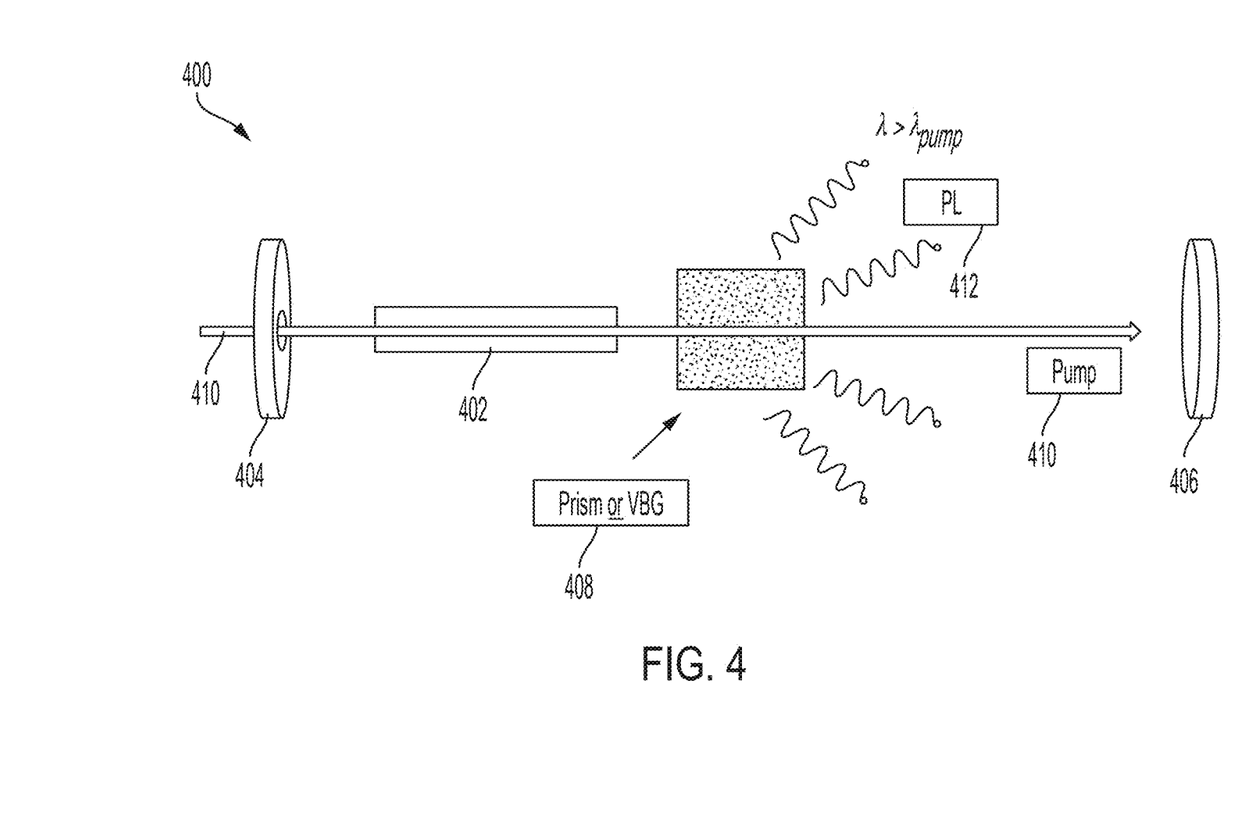
FIG. 4 shows an intracavity refractive or diffractive element (prism or VBG) to deflect photoluminescence (PL) at wavelengths longer than the pump according to examples of the present teachings.

FIG. 4 shows multi-pass pumping arrangement 400 with an intracavity refractive or diffractive element (such as a prism or volume Bragg grating (VBG)) that deflects photoluminescence (PL) at wavelengths longer than the pump according to examples of the present disclosure. As shown in FIG. 4, a cooling crystal 402 is optically pumped by an optical source, such as a laser, having a pump optical beam 410. In some examples, at least one of the multi-pass mirrors 404 or 406 can be external to the multi-pass pumping cell or coated onto one or more of the crystal facets. In some examples, at least one of the multi-pass pumping mirrors 404 or 406 can comprise a spectrally selective coating that is formed, deposited, or positioned on an inward facing surface with respect to the cooling crystal 402. The pumping cell can comprise one or more frequency-selective elements 408 that are used in the pumping cell are refractive elements, like a prism or diffractive elements, like a VBG. The one or more frequency-selective elements 408 results in in a wavelength-dependent deflection, which can be used the let the pump wavelength circulate inside the cavity, but deflect longer 412 (and likely shorter) wavelength PL light out of the cooling crystal 402.

Figure 5:
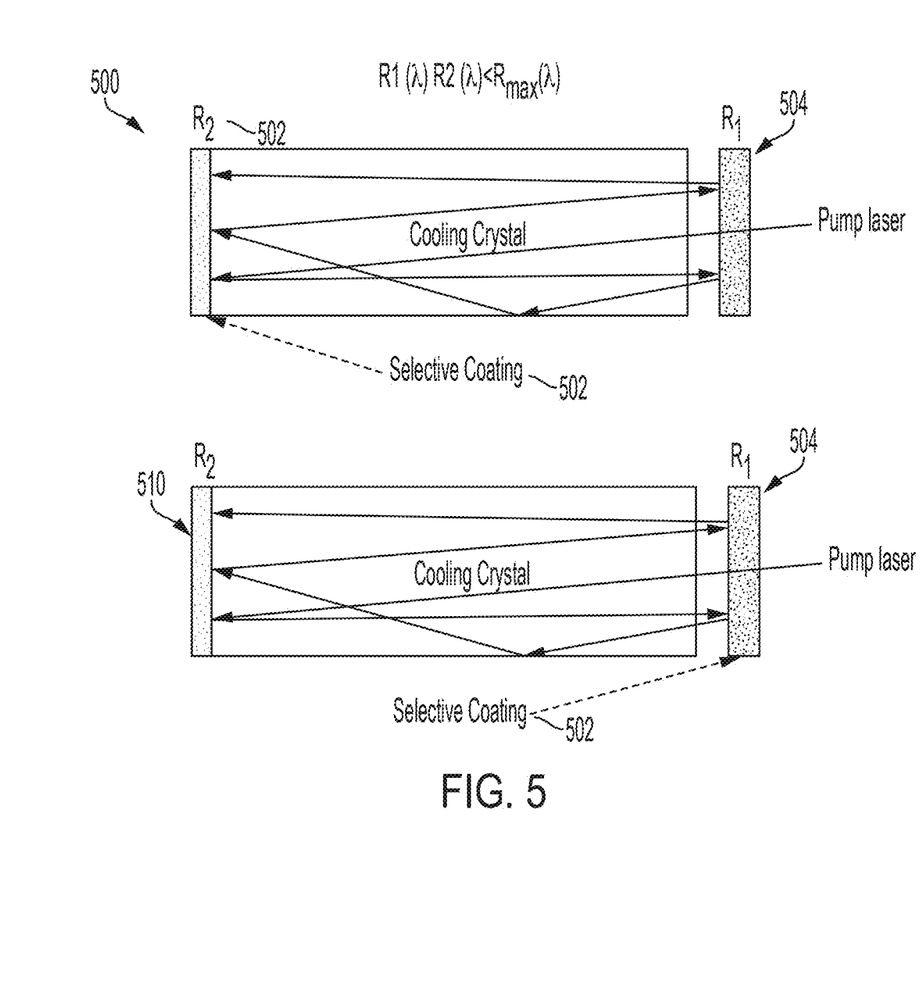
FIG. 5 shows a first multi-pass arrangement that is similar to FIG. 2A and FIG. 3A with the second mirror $R_2$ having a selective coating and a second multi-pass arrangement that is similar to FIG. 2A and FIG. 3A with the first mirror $R_1$ having the selective coating.

In some examples, the first mirror 202, 302, 404 and the second mirror 204, 304, 406 do not need to have the same spectral reflectivity. That is one mirror may have broadband reflectivity and the other mirror may have the spectral coating, as long as the product of the two reflectivities are below certain values (e.g., 95%) at the desired wavelengths. FIG. 5 shows a multi-pass arrangement 502 that is similar to FIG. 2A and FIG. 3A with the second mirror $R_2$ 502 having a selective coating 502, as discussed above and further below, and a multi-pass arrangement 510 that is similar to FIG. 2A and FIG. 3A with the first mirror $R_1$ 504 having the selective coating 502.

An ideal thermal link for an optical refrigerator must have (i) extremely high florescence rejection, (ii) high optical quality (negligible parasitic absorption), (iii) withstand thermal cycling, and (iv) have high thermal conductivity. The undoped YLF, employed in Ref.[[10]], lacks the last requirement with a thermal conductivity of κ=6 W/mK (at room temperature) that led to >6 K final temperature drop. As shown in Table 1, $MgF_2$ with a thermal conductivity that is 5× larger than YLF, is nearly CTE-matched as long as its crystallographic axis are aligned accordingly, as shown in FIG. 6B.

Figure 6A:
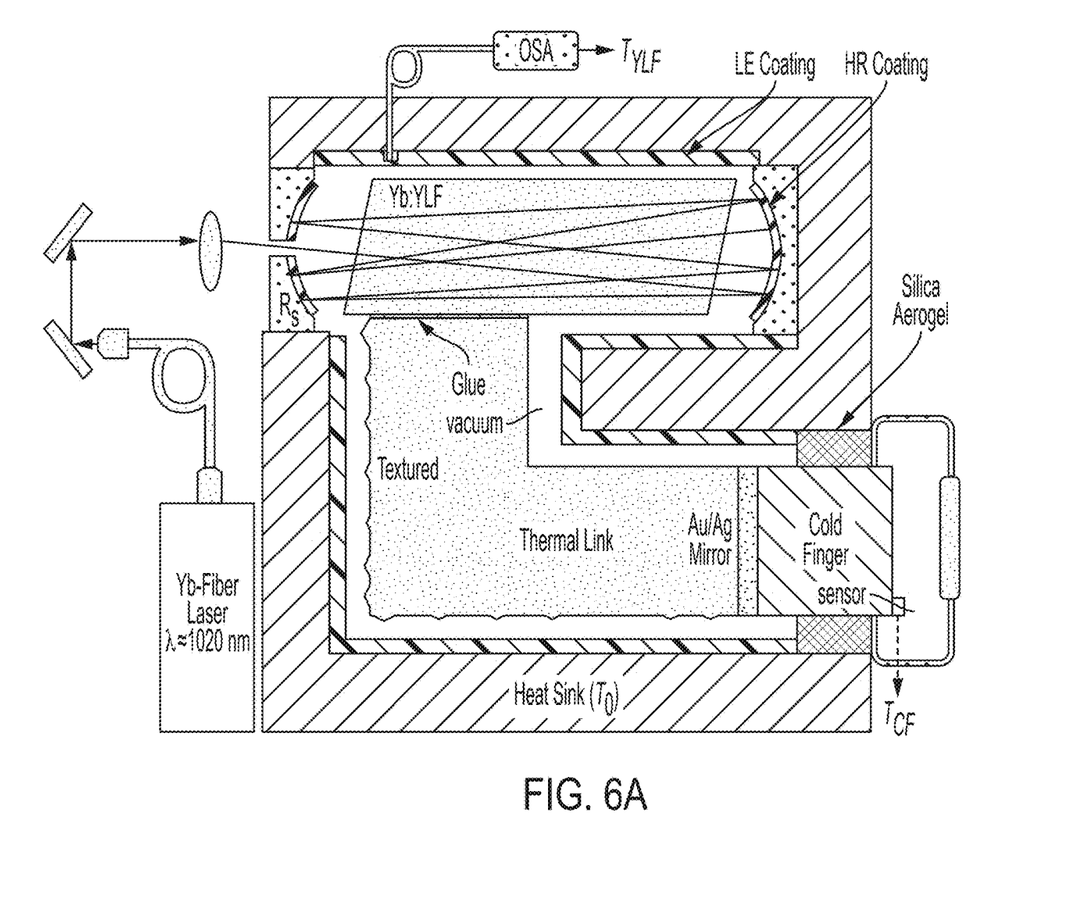
FIG. 6A shows a schematic diagram of cryo-cooler setup according to examples of the present disclosure.
Figure 6B:
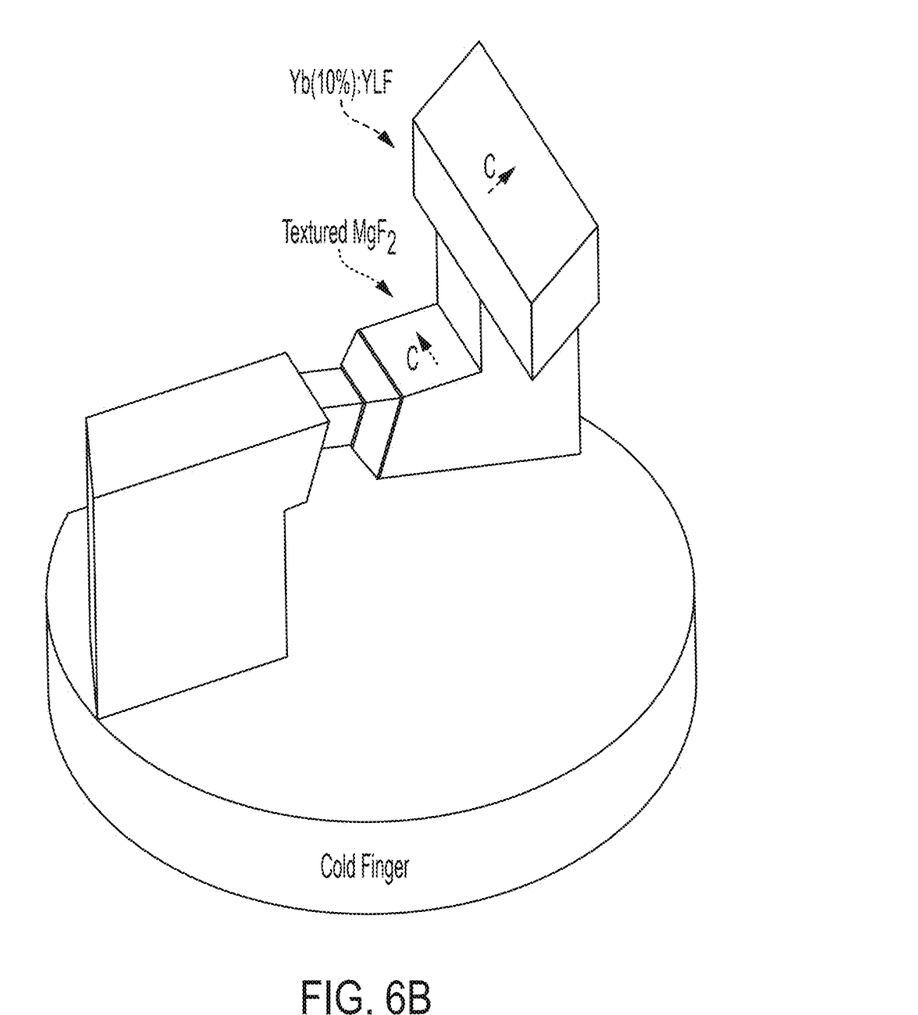
FIG. 6B shows a photograph of copper cold finger with MgF$_2$ heat link and Yb:YLF cooling crystal according to examples of the present disclosure.
Figure 7:
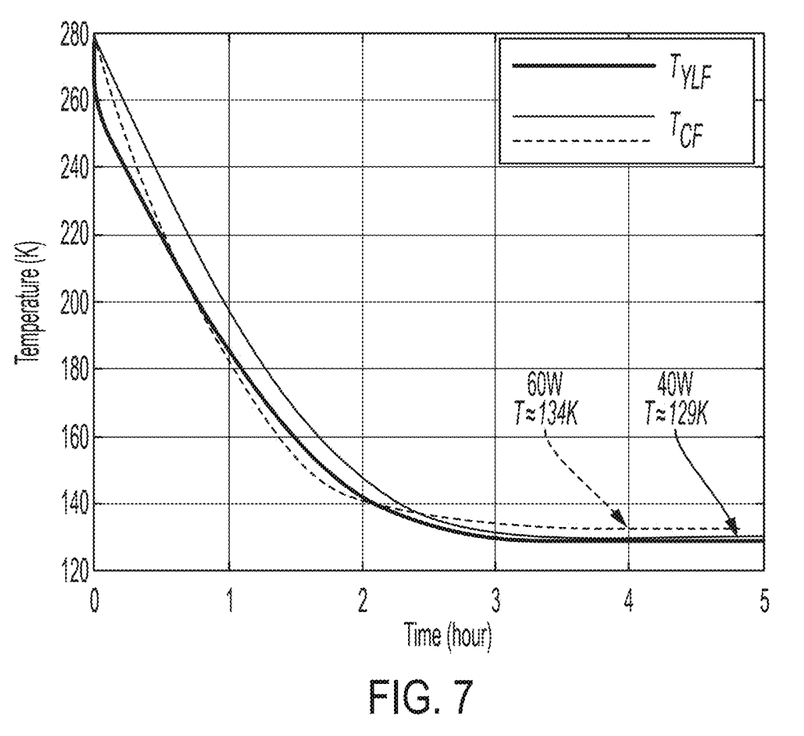
FIG. 7 shows a plot of Yb:YLF and cold finger temperature during cooling experiment for 40 W (solid lines) and 60 W (dashed line) of incident laser power according to examples of the present disclosure

FIG. 6A shows a schematic diagram of cryo-cooler setup according to examples of the present disclosure. FIG. 5B shows a photograph of copper cold finger (CF) with $MgF_2$ heat link and Yb:YLF cooling crystal according to examples of the present disclosure. The geometric shape of the link is designed to minimize the fluorescence leakage to the CF. Prior to bonding to the CF, the end surface of the link is coated with a metallic mirror using sputter deposition of 200 nm of silver, followed by 200 nm of gold. This leads to a silver mirror that further protects the CF from fluorescence. While the YLF link was not textured, careful inspection of that assembly later indicated that the presence of unintentional surface roughness and imperfections (e.g. chips) played a role in facilitating the fluorescence shielding. The ray-tracing models indeed indicated that perfectly polished surfaces leads to a much larger fluorescence leakage to the load. We also found that using a thin layer of commercial cyanoacrylate glue (Loctite) performs sufficiently well in bonding the Yb:YLF to the link without introducing any noticeable thermal resistance. The first cooling experiment using this new link was performed as described earlier (FIG. 6A). With 40 W incident power, CF temperature reached a new record of ≈129K, as shown in FIG. 7. Notable in this experiment is also the relatively small temperature differential $\Delta T_d$ (<1 K) as a result of the much higher thermal conductivity of $MgF_2$ link compared with that of YLF.

TABLE 1

Thermal conductivity and coefficient of thermal expansion for laser cooling and heat link materials.

| Heat-Link | YLF | Sapphire | $MgF_2$ |
|---|---|---|---|
| κ (W/mK) @ 300K | ~6 | ~40 | ~30 |
| CTE ($10^{-6}$ $K^{-1}$) | 13 (IIa) | 6.95 (IIa) | 13.7 (IIc) |
|  | 8 (IIc) | 5.9 (IIc) | 8.9 (IIa) |

FIG. 7 shows a plot of Yb:YLF and cold finger temperature during cooling experiment for 40 W (solid lines) and 60 W (dashed line) of incident laser power according to examples of the present disclosure. Increasing the pump power to 60 W however does not produce a lower temperature but rather leads to a CF temperature of 134K as shown in FIG. 7 (dashed line). For clarity, the Yb:YLF temperature is not shown for the 60 W experiment. In the following section, the role of stimulated-emission and saturation is discussed as the possible origins of such nonlinearities in power scaling, offer solutions to mitigate it, and show the preliminary experiments with a record CF temperature below 125K.

Power-Scaling Nonlinearity. The effective heat lift in the experiment in, estimated at around 150 mW was mostly parasitic, dominated by the radiative load, and the useful load (from the IR sensor) only accounted for <10 mW. In applications requiring higher heat lift, and lower temperatures, the cooler must be power scaled by increasing the absorbed power of the pump laser. The lowest temperature is bound by the so-called minimum achievable temperature (MAT) of a given crystal that is the temperature at which the cooling efficiency vanishes and changes sign at the optimum pump wavelength. The cooling efficiency, defined as the ratio of the cooling power (total heat-lift) to the absorbed pump power, is given by:

$$\eta_c(\lambda, T) = \left(\frac{\eta_{ext}}{1 + \alpha_b(T)/\alpha_r(\lambda, T)}\right)\frac{\lambda}{\lambda_f(T)} - 1, \quad (1)$$

where $\eta_{ext}$ (external quantum efficiency) is the fraction of excited ions that decay by emitting a photon exiting the medium (crystal). This quantity, which is often >99% in high quality Yb:YLF crystals, is largely assumed to be temperature independent. As the temperature of the crystal is lowered, the absorption coefficient of the cooling transition, $\alpha_r(\lambda, T)$, in the cooling regime, drastically reduces while the mean fluorescence wavelength $\lambda_f(T)$ redshifts, both detrimental to the cooling efficiency. These temperature dependences simply result from the rapid establishment of quasi-equilibrium Boltzmann distribution of the ions in their corresponding ground- and excited-states and are therefore considered a fundamental property of the active ion in each host crystal. It is therefore only the presence of the unwanted impurities characterized by the background absorption coefficient, $\alpha_b$, that imposes a practical limit on the achievable temperature (MAT), above the recoil limit[14]. In the early analysis of the optical refrigeration, this coefficient was assumed to be broadband and temperature independent. However, in order to explain the lowest temperatures achieved in some Yb:YLF crystals, recent experiments and analysis indicated that ab must exhibit a favorable temperature dependent; i.e. it appreciably decreases at lower crystal temperatures. Taking such temperature dependences into account, the MAT for the highest quality 10% Yb:YLF crystals is estimated to be ≈70-80K. Therefore, absent any nonlinearities in the cooling efficiency, and assuming a constant thermal ground ($T_0$), the final temperature of the cooling crystal $T_f$ must approach MAT as the absorbed power is increased. This is simply governed by the steady-state condition where the cooling power is balanced by the thermal load:

$$\eta_c(\lambda,T_f)P_{abs}(T_f) = P_{load}(T_f, T_0), \quad (2)$$

Data in FIG. 7, however, suggests that the power scaling does not follow this simple prediction. To investigate the power scaling issues more closely, we employed the simple experimental arrangement (referred to as power-cooling set-up) shown in FIG. 8A.

Figure 8A:
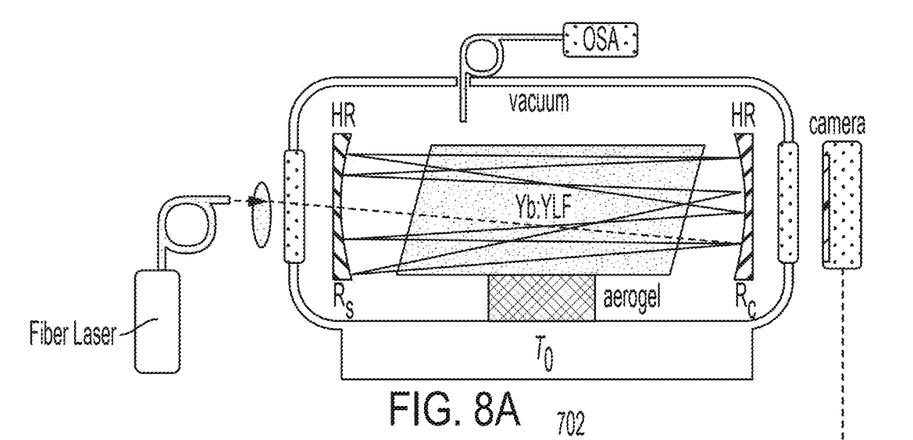
FIG. 8A shows a power-cooling (crystal only) experimental setup according to examples of the present disclosure.
Figure 8B:
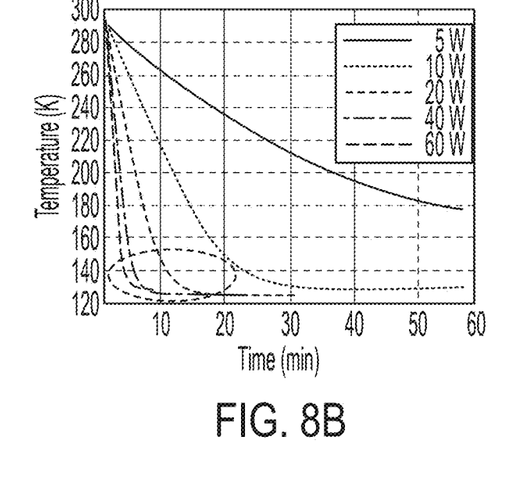
FIG. 8B shows a plot for Yb:YLF temperature for different laser powers according to examples of the present disclosure.
Figure 8C:
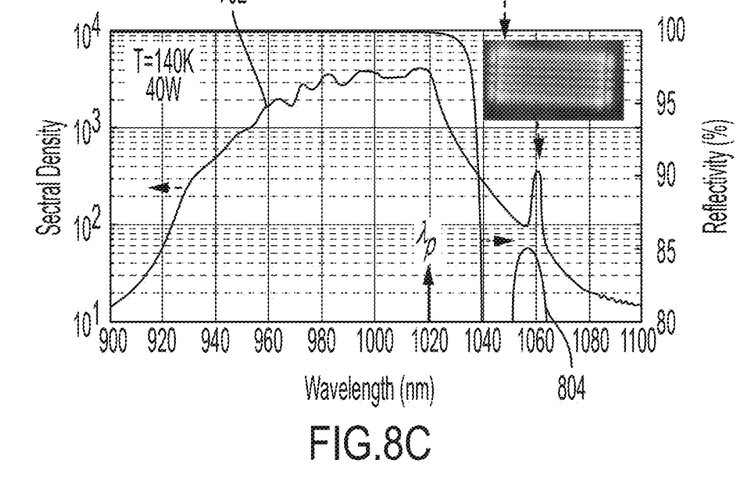
FIG. 8C shows a plot for fluorescence spectrum showing lasing near 1060 nm; inset: CCD image of lasing mode.

FIG. 8A shows a power-cooling (crystal only) experimental setup according to examples of the present disclosure. FIG. 8B shows a plot for Yb:YLF temperature for different laser powers according to examples of the present disclosure. FIG. 8C shows a plot for fluorescence spectrum (line 802) showing lasing near 1060 nm; inset: CCD image of lasing mode. Also shown (line 804) is the reflectivity spectrum of a dielectric mirror designed to suppress lasing.

This arrangement uses the cooling crystal only in a pump circulator cavity, but without the clamshell and the thermal link. This simple geometry, at the cost of a much higher but constant and stable radiative load, allows us to investigate the power scaling without potential thermal load nonlinearities (e.g. excess heating of the tight clamshell walls). The temporal evolution of the crystal temperature is measured as before (using DLT) after the pump laser is turned on, for various incident pump powers. A CCD camera is placed after the cylindrical mirror for primarily monitoring the pump beam pattern and for optimizing the mirrors alignment in the Herriott cell (AHC) circulator.

As the data in FIG. 8B indicates, while the initial cooling slopes scales properly with the incident power, the final temperature reaches a minimum of 125K at 20 W incident power. However, similar to the prototype experiment, increasing the pump power does not further reduce the final temperature but rather increases. Interestingly, such turn-over is most often accompanied by the observation of laser oscillation in the Stokes regime (e.g., at $\lambda \approx 1060$ nm), as shown in the side-scattered PL spectrum in FIG. 8C. One spectacular yet rare example of the observed mode structure, as seen by the monitor camera, is shown in the inset of the FIG. 8C. The detrimental role of amplified spontaneous emission and subsequent parasitic lasing was recently analyzed in details, and was shown that the presence of a high finesse cavity formed by the pump circulator effectively leads to a power-dependent red-shift of $\lambda_f$ that eventually reverses the cooling process at high absorbed powers. As was suggested, the solution is to spoil the circulator's Q in the Stokes regime by using spectrally selective (low-pass) HR mirrors. The other source of nonlinearity is obviously saturation of pump absorption which was carefully studied recently for in Yb:YLF at $\lambda=1020$ nm. Saturation can be mitigated by properly selecting the pump circulator parameters ($R_c$, $R_s$, cavity length and initial spot size of the pump at the entrance hole) so that the intensity of the pump (averaged over many roundtrips) remains a fraction of the saturation intensity at the target temperature of $T \approx 120K$.

Figure 9:
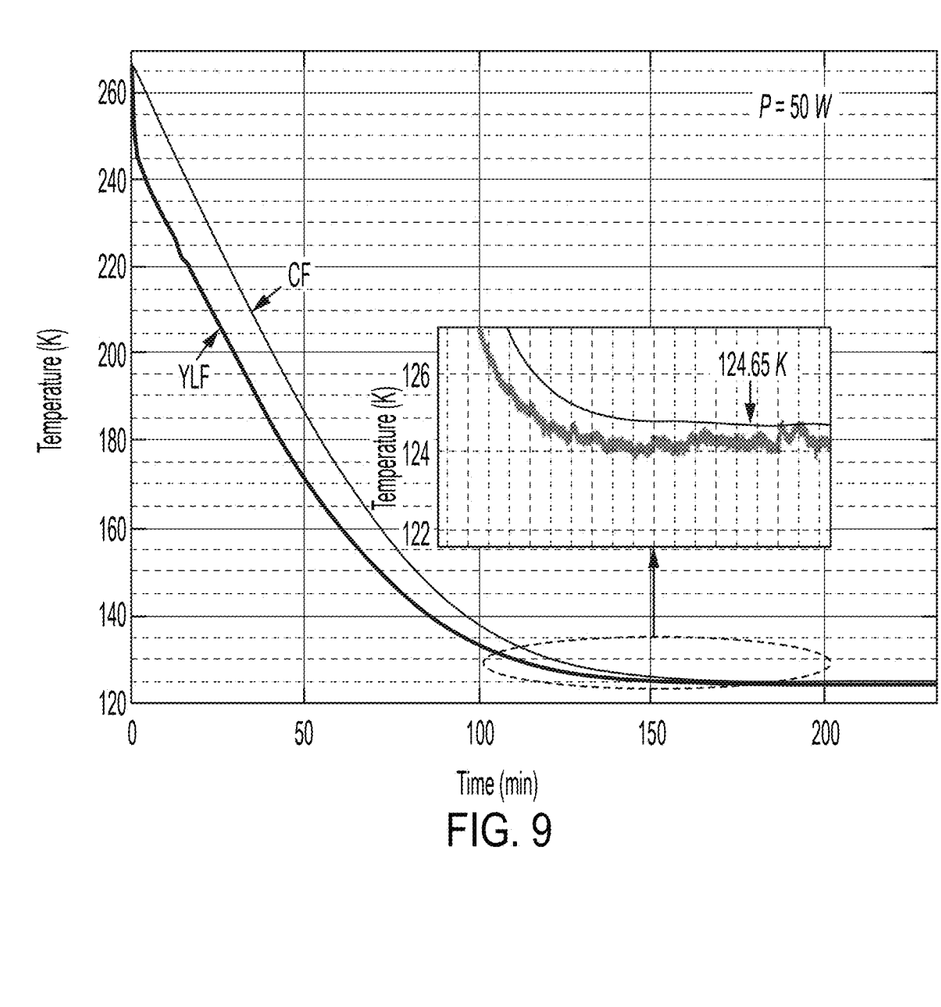
FIG. 9 shows a plot for Yb:YLF and cold finger temperature during cooling experiment utilizing spectrally optimized mirrors according to examples of the present disclosure.

Suppression of Stimulated Emission. The analysis in Ref. [16] indicated that ASE and parasitic lasing can be sufficiently suppressed by reducing the effective finesse $\approx (1-R)^{-1}$ to <20. Dielectric mirror coatings with R>99.5% at the pump wavelength (1020 nm) but with decreasing reflectivity (R<95%) for $\lambda$>1040 nm were designed and fabricated using ion-beam sputtering (MLD Technologies, L.L.C.) using various spherical and cylindrical substrates. A typical measured reflectivity spectrum of such mirrors is shown in FIG. 7C, superimposed on the measured side PL spectrum. The cooler of FIG. 6A was then reassembled using the new mirrors and the MgF$_2$ thermal link. The AHC was designed with mirror radii $R_s$=50 cm, $R_c$=50 cm separated by L≈8 cm to assure the average intensity at the highest incident power remains ≲½ of the saturation intensity at 120K. This resulted in a new payload cooling record of 124.7K at 50 W incident power as shown in FIG. 9. The inset shows the temperature differential between the YLF and the cold-finger to be ≲1K. However, increasing the incident power beyond 50 W still does not lower the temperature further towards MAT. Possible explanations for the remaining such nonlinearities may include one or a combination of absorption saturation, self-focusing of the pump beam and the scattering of the leftover pump power into the cold finger. FIG. 9 shows a plot for Yb:YLF and cold finger temperature during cooling experiment utilizing spectrally optimized mirrors according to examples of the present disclosure.

In summary, a cooling of a payload to <125K using optical refrigeration in a 10% doped Yb:YLF crystal is disclosed, which was achieved by suppression of stimulated emission using spectrally selective mirror coatings in the pump circulator cavity as well as employing a novel textured MgF$_2$ thermal link offering low thermal resistance while providing robustness in thermal cycling. This result is particularly promising for cooling payloads in a vibration-free environment in applications such as cooling single crystal silicon reference cavity for high-precision optical clocks, as well as other applications.

While the embodiments have been illustrated respect to one or more implementations, alterations and/or modifications can be made to the illustrated examples without departing from the spirit and scope of the appended claims. In addition, while a particular feature of the embodiments may have been disclosed with respect to only one of several implementations, such feature may be combined with one or more other features of the other implementations as may be desired and advantageous for any given or particular function.

Notwithstanding that the numerical ranges and parameters setting forth the broad scope of the embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g., −1, −2, −3, −10, −20, −30, etc.

Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other embodiments will be apparent to those skilled in the art from consideration of the specification and practice of the descriptions disclosed herein. It is intended that the specification and examples be considered as exemplary only, with a true scope and spirit of the embodiments being indicated by the following claims.

What is claimed is:

1. A laser cooling system comprising:
   a multi-pass optical cavity;
   a first mirror positioned at a first end of the multi-pass optical cavity; and
   a second mirror positioned at a second end of the multi-pass optical cavity, wherein the first mirror or the second mirror comprises a spectrally selective coating to suppress amplified spontaneous emission (ASE) and parasitic lasing to avoid undesired heat generation in a material being cooled in the multi-pass optical cavity, and wherein the first mirror, the second mirror, or both the first mirror and the second mirror have low reflectivity for longer wavelengths of a fluorescence spectrum.

2. The laser cooling system of claim 1, wherein the first mirror comprises a hole to allow a pump laser beam to enter and an output laser beam to exit the multi-pass optical cavity.

3. The laser cooling system of claim 1, wherein the material being cooled comprises a rare-earth-doped crystal.

4. The laser cooling system of claim 1, wherein the spectrally selective coating introduces a loss at wavelengths longer than a pump laser and prevents buildup of ASE and eliminates laser oscillation at longer wavelengths by ensuring a net optical gain that never exceeds losses in each roundtrip in the multi-pass optical cavity.

5. The laser cooling system of claim 1, wherein the spectrally selective coating comprises a dielectric coating or a distributed Bragg reflector that is deposited on a surface of the first mirror or the second mirror.

6. The laser cooling system of claim 1, wherein the material being cooled comprises an additional spectrally selective coating that comprises a dielectric coating or a distributed Bragg reflector that is deposited on a surface of the material being cooled.

7. The laser cooling system of claim 1, wherein the spectrally selective coating provides high reflectivity at a pump laser wavelength.

8. The laser cooling system of claim 7, wherein the high reflectivity is greater than 99% at about 1020 nm for a Yb-based cooling material.

9. The laser cooling system of claim 1, wherein the spectrally selective coating provides a drop-off of reflectivity for wavelengths longer than a pump wavelength.

10. The laser cooling system of claim 9, wherein the drop-off of reflectivity is about less than 97% at 1030 nm for and about less than 90% at 1040 nm for a Yb-based cooling material.

11. The laser cooling system of claim 1, wherein the spectrally selective coating provides lower reflectivity at shorter wavelengths than a pump wavelength.

12. A laser cooling system comprising:
   a multi-pass optical cavity;
   a first mirror positioned at a first end of the multi-pass optical cavity;
   a second mirror positioned at a second end of the multi-pass optical cavity;
   a wavelength-selective element positioned in the multi-pass optical cavity, wherein the wavelength-selective element comprises a spectrally selective coating to suppress amplified spontaneous emission (ASE) and parasitic lasing to avoid undesired heat generation in a material being cooled in the multi-pass optical cavity.

13. The laser cooling system of claim 12, wherein the wavelength-selective element deflects or absorbs wavelength longer than a pump laser wavelength.

14. The laser cooling system of claim 12, wherein the wavelength-selective element comprises dichroic or narrow-band filter, a birefringent filter, a prism, or a diffractive element.

15. A method for laser cooling, the method comprising:
   directing a pump laser beam into a multi-pass optical cavity, the multi-pass cavity comprising a first mirror positioned at a first end of the multi-pass optical cavity and a second mirror positioned at a second end of the multi-pass optical cavity, wherein the first mirror or the second mirror comprises a spectrally selective coating to suppress amplified spontaneous emission (ASE) and parasitic lasing to avoid undesired heat generation in a material being cooled in the multi-pass optical cavity and wherein the first mirror, the second mirror, or both the first mirror and the second mirror have low reflectivity for longer wavelengths of a fluorescence spectrum; and
   optically cooling the material by repeated passes of the pump laser beam.

16. The method of claim 15, wherein the first mirror comprises a hole to allow an input laser beam to enter and an output laser beam to exit the multi-pass optical cavity.

17. The method of claim 15, wherein the material being cooled comprises a rare-earth-doped crystal.

18. The method of claim 15, wherein the spectrally selective coating introduces a loss at wavelengths longer than a pump laser and prevents buildup of ASE while eliminating laser oscillation at longer wavelengths by ensuring a net optical gain that never exceeds losses in each roundtrip in the multi-pass optical cavity.

19. A method of laser cooling, the method comprising:
  directing a pump laser beam to a multi-pass optical cavity, wherein the multi-pass optical cavity comprises a first mirror positioned at a first end of the multi-pass optical cavity, a second mirror positioned at a second end of the multi-pass optical cavity, and a wavelength-selective element positioned in the multi-pass optical cavity, wherein the wavelength-selective element comprises a spectrally selective coating to suppress amplified spontaneous emission (ASE) and parasitic lasing to avoid undesired heat generation in a material being cooled in the multi-pass optical cavity; and
  optically cooling the material by repeated passes of the pump laser beam.

20. The method of claim 19, wherein the wavelength-selective element deflects or absorbs wavelength longer than a pump laser wavelength.

21. The method of claim 19, wherein the wavelength-selective element comprises dichroic or narrow-band filter, a birefringent filter, a prism, or a diffractive element.

* * * * *